April 25, 1961     N. LINDQUIST     2,981,009
EDUCATIONAL BUILDING BLOCK SET
Filed June 12, 1959
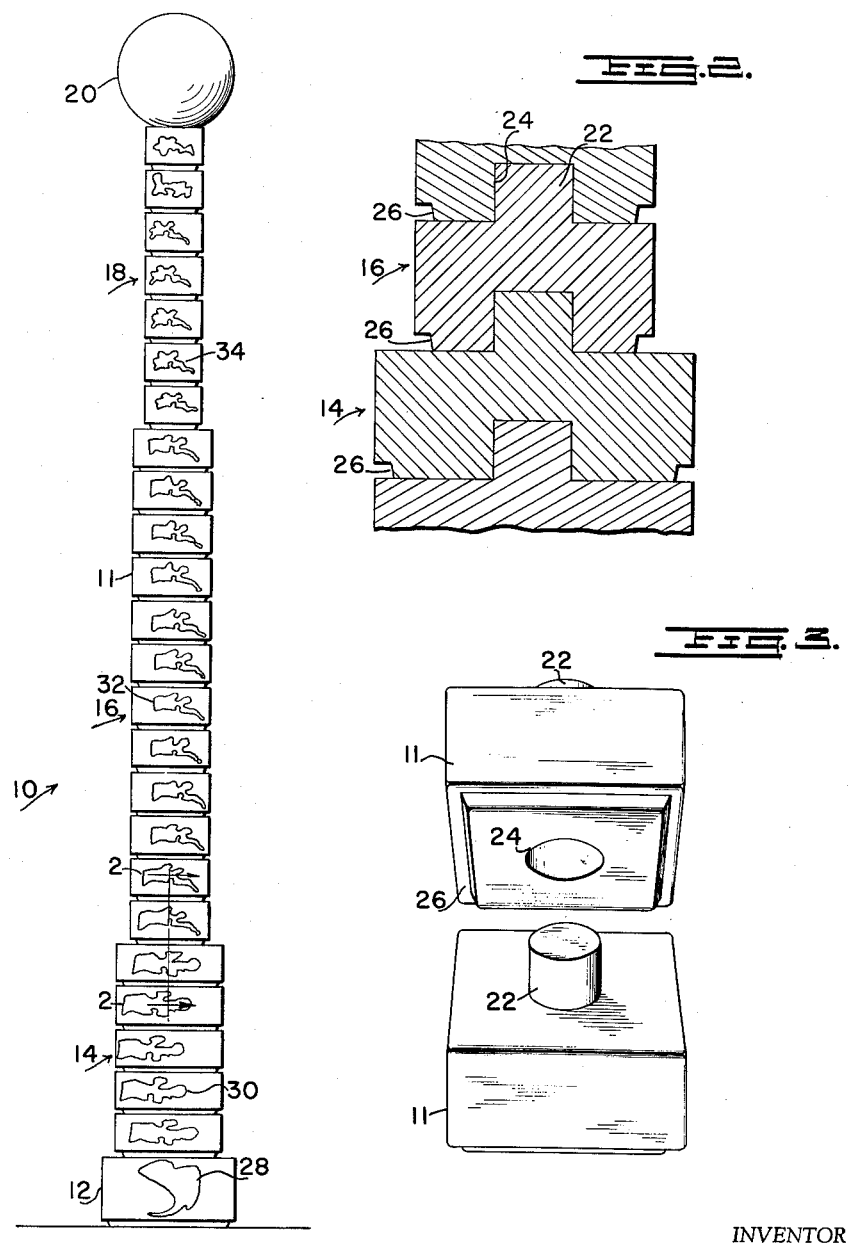
INVENTOR
NORA LINDQUIST
BY
ATTORNEY United States Patent Office 2,981,009
Patented Apr. 25, 1961

2,981,009
EDUCATIONAL BUILDING BLOCK SET
Nora Lindquist, 201 N. 15th St., Fort Smith, Ark.
Filed June 12, 1959, Ser. No. 819,906
3 Claims. (Cl. 35—17)

This invention relates to educational devices, and more particularly to educational building block sets.

It is an object of this invention to provide an educational building block set which when assembled simulates the spinal column of the human body.

It is another object of this invention to provide a building block set including a plurality of separate block members which may be easily interconnected into an assembled column simulating the human spinal column.

It is another object of this invention to provide a block set which is valuable as an educational aid in teaching the relationship to each other of the various vertebrae of the human spinal column.

In achievement of these objectives, there is provided in accordance with an embodiment of this invention, an educational block set comprising a plurality of blocks divided into groups of graduated sizes, with the individual blocks having dowel pin or other suitable interconnections therebetween which permit the blocks to be assembled together into a column simulating the spinal column of the human body. The groups of graduated blocks represent the various areas of the human spinal column, including the sacrum base with coccyx, the lumbar vertebrae, the dorsal or thoracic vertebrae, and the cervical vertebrae. To further enhance the simulation of the spinal column, the assembled block column is surmounted by a substantially spherical member which simulates the human head, and which is in interlocked relation with the uppermost block member of the group representing the cervical vertebrae. A further feature of the construction which still further increases the simulation of the human spinal column is the cutting away or rabbeting of the surface of one block of each pair of facing blocks in the assembled column to thereby provide a portion of reduced cross-section between adjacent blocks which simulates the discs between adjacent vertebrae of the human spine.

To still further enhance the simulation of the human spinal column provided by the assembled set of blocks, each block has on one side face thereof a visual representation in side elevation of the particular spinal element which the respective block represents.

Further objects and advantages of the invention will become apparent from the following description taken in conjunction with the accompanying drawing, in which:

Fig. 1 is a view in vertical elevation of the block set in accordance with the invention in assembled relation to simulate the spinal column of the human body;

Fig. 2 is a view in vertical section along line 2—2 of Fig. 1 showing the interlocking relation between adjacent superposed block members; and Fig. 3 is a perspective view illustrating a pair of adjacent block members and their interlocking relation with each other.

Referring now to the drawing, there is shown an educational block set generally indicated at 10 and including a plurality of block members 11 of graduated sizes which when assembled in superposed interlocking relation with each other simulate the spinal column of the human body. As shown in the drawing, the individual block members 11 have substantially the shape of a parallelepiped, including opposed sets of planar parallel faces. The block members may be made of any suitable material, although a preferred material is ponderosa pine wood. The block assembly 10 includes a base or first block member 12 which represents the sacrum base with coccyx, a group of block members generally indicated at 14 positioned above base block 12 and including five superposed interlocking blocks of the same size as each other but of a smaller size than base block 12. The five blocks of group 14 represent the five lumbar vertebrae of the human spinal column. Positioned in superposed relation above block group 14 is a block group 16 including twelve blocks the same size as each other but of smaller size than the blocks in group 14. The twelve blocks of group 16 represent the twelve dorsal or thoracic vertebrae of the human spinal column. Superposed above the block group 16 is a block group 18 including seven blocks of the same size as each other but of smaller size than the blocks of group 16. The seven blocks of group 18 represent the seven cervical vertebrae of the human spinal column. Superposed above the topmost block of group 18 is a substantially spherical or ball-like member 20 which simulates the head or skull of the human body.

In an actual embodiment of the invention which has been constructed, the base block 12 representing the sacrum base with coccyx measures 4" x 4" x 2"; the five blocks in group 14 representing the lumbar vertebrae each measures 3¼" x 3¼" x 1"; the twelve blocks in group 16 representing the dorsal or thoracic vertebrae each measures 2½" x 2½" x 1"; the seven blocks of group 18 representing the cervical vertebrae each measures 1¾" x 1¾" x 1"; while the sphere or ball 20 representing the human head or skull measures 3¼" in diameter.

In order to provide an interlocking engagement between adjacent blocks which permits the blocks to be stacked into a vertical column as shown in Fig. 1 which remains in securely stacked relation, the upper face of each block is provided with a dowel member 22 while the lower face of each block except bottom block 12 is provided with a hole or recess 24 adapted to receive the dowel 22 of the adjacent block member. The spherical ball member 20 at the upper end of the column is provided with a flattened surface portion where it engages the uppermost block of the column, and a recess or hole 24 is provided in the flattened surface of ball 20 to receive the dowel member 22 of the uppermost block of block group 18. In the embodiment which was constructed, the dowel member was made ¾" in diameter 1" long and was glued into a circular recess in the block of such depth that the dowel projected ¾" above the surface of the block face in which it was mounted. The mating recess 24 of the adjacent block was made of a diameter such as to closely engage the dowel member 22, and of a depth such that the entire height of dowel member 22 was received in recess 24.

In order to simulate the discs between adjacent vertebrae of the human spinal column, the bottom surface of each block, including the bottom-most block 12, is provided with a rabbet or groove 26 which, when the blocks are assembled in vertical superposed relation, provides a portion of reduced cross-section between the facing surfaces of adjacent blocks which simulates the discs between the vertebrae of the human spinal column.

To further increase the illusionary effect of the block column in simulating the spinal column of the human body, corresponding outer faces of the respective blocks are provided with a visual representation thereon of the spinal member which the respective block represents in the assembled column. Thus, the base or bottom block 12 is provided on an outer face thereof with a visual representation in lateral view or side elevation of the sacrum base with coccyx as indicated at 28. Each of the blocks in the group 14 is provided on a corresponding outer face with a visual representation in lateral view or side elevation of one of the lumbar vertebrae as indicated at 30. Similarly, each of the blocks in the group 16 is provided on a side face thereof with a visual representation of one of the dorsal or thoracic vertebrae as indicated at 32; while each of the blocks in the group 18 is provided on one side face thereof with a visual representation of one of the cervical vertebrae as indicated at 34. The spinal members shown on the various blocks are preferably painted with white paint on a black background.

In order to insure that the blocks are assembled in the proper sequence by the user, each block is suitably numbered, preferably on the upper face thereof. Thus, base block 12 carries the number "1," while the other blocks carry appropriate numbers to insure proper sequential assembly of the blocks.

The other faces of the blocks may also be decorated with any desired and suitable artistic or educational material.

It can be seen from the foregoing that there is provided in accordance with this invention a block set which is so constructed that when in interlocked assembled relation it represents the spinal column of the human body in a realistic manner. The block set is of educational value in teaching the relation to each other of the various elements of the human spinal column. The block set also has other educational values since its use helps to develop coordination and concentration in the child, as well as contributing to the child's pleasure and sense of achievement.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. An educational block set adapted to simulate the spinal column of the human body comprising a base block member representing the sacrum base with coccyx; a first group of block members vertically superposed on said base block member and representing the lumbar vertebrae; a second group of block members of smaller size than said first group vertically superposed on said first group and representing the dorsal vertebrae; a third group of block members of smaller size than said second group vertically superposed on said second group and representing the cervical vertebrae; said base block member and the individual block members of said first, second, and third groups respectively including planar parallel faces; at least one block member of each pair of facing block members having a rabbeted portion of reduced cross section in facing relation to the other block member of the pair to thereby simulate a spinal disc between adjacent block members; a spherical member vertically superposed on said third group and representing the human head; and means interlocking adjacent members to each other to maintain said members in assembled relation to simulate the spinal column.

2. An educational block set adapted to simulate the spinal column of the human body comprising a base block member representing the sacrum base with coccyx; a first group of five block members vertically superposed on said base block member and representing the five lumbar vertebrae; a second group of twelve block members of smaller size than said first group vertically superposed on said first group and representing the twelve dorsal vertebrae; a third group of seven block members of smaller size than said second group vertically superposed on said second group and representing the seven cervical vertebrae; said base block member and the individual block members of said first, second, and third groups respectively including planar parallel faces; at least one block member of each pair of facing block members having a rabbeted portion of reduced cross section in facing relation to the other block member of the pair to thereby simulate a spinal disc between adjacent block members; a spherical member vertically superposed on said third group and representing the human head; and means interlocking adjacent members to each other to maintain said members in assembled relation to simulate the spinal column.

3. An educational block set adapted to simulate the spinal column of the human body comprising a base block member representing the sacrum base with coccyx; a first group of block members vertically superposed on said base block member and representing the lumbar vertebrae; a second group of block members of smaller size than said first group vertically superposed on said first group and representing the dorsal vertebrae; a third group of block members of smaller size than said second group vertically superposed on said second group and representing the cervical vertebrae; said base block member and the individual block members of said first, second, and third groups respectively including planar parallel faces; at least one block member of each pair of facing block members having a rabbeted portion of reduced cross section in facing relation to the other block member of the pair to thereby simulate a spinal disc between adjacent block members; and means interlocking adjacent block members to each other to maintain said block members in assembled relation to simulate the spinal column.

References Cited in the file of this patent

UNITED STATES PATENTS

| | | |
|---|---|---|
| 979,147 | Fryette | Dec. 20, 1910 |
| 983,547 | Fleck | Feb. 7, 1911 |
| 1,895,611 | Doak | Jan. 31, 1933 |
| 2,107,691 | Corser | Feb. 8, 1938 |
| 2,108,229 | Metz | Feb. 15, 1938 |

FOREIGN PATENTS

| | | |
|---|---|---|
| 473,978 | Canada | May 29, 1951 |
| 605,262 | Germany | Nov. 8, 1934 |
| 630,302 | Great Britain | Oct. 10, 1949 |